Figure 1:
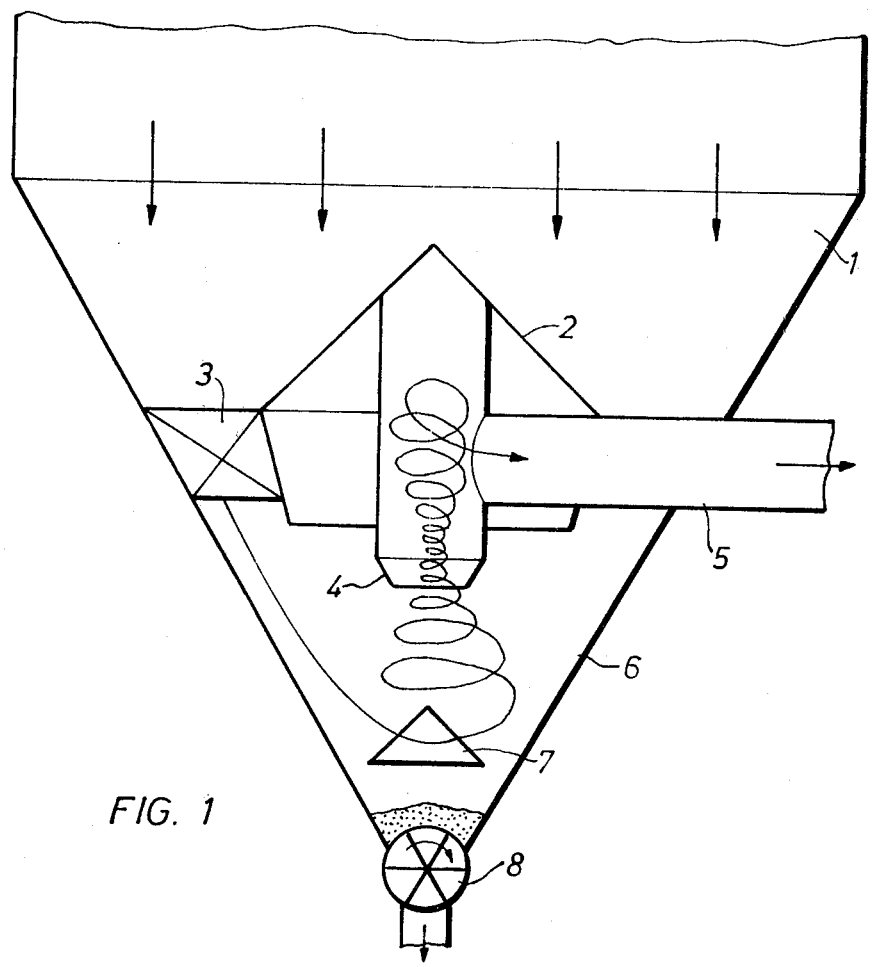

United States Patent [19]

Muschelknautz et al.

[11] 4,211,604

[45] Jul. 8, 1980

[54] APPARATUS FOR THE MECHANICAL SEPARATION OF SOLIDS FROM DRYING GAS IN SPRAY DRIERS

[75] Inventors: Edgar Muschelknautz, Leverkusen; Heiko Herold, Dormagen; Kunz Brunner, Cologne; Walter Horstmann, Schildgen, all of Fed. Rep. of Germany

[73] Assignee: Bayer Aktiengesellschaft, Leverkusen, Fed. Rep. of Germany

[21] Appl. No.: 655,319

[22] Filed: Feb. 4, 1976

[30] Foreign Application Priority Data

Feb. 26, 1975 [DE] Fed. Rep. of Germany ....... 2508266

[51] Int. Cl.² .............................................. B01D 1/18
[52] U.S. Cl. .................................................... 159/4 D
[58] Field of Search .................................... 159/4, 4 D

[56] References Cited

U.S. PATENT DOCUMENTS

| | | | |
|---|---|---|---|
| 2,890,764 | 6/1959 | Arnold | 159/4 B |
| 3,195,241 | 7/1965 | Hohne | 159/4 D |
| 3,414,980 | 12/1968 | Nezbed | 159/4 D |
| 3,423,843 | 1/1969 | LaGuilharre | 159/4 D |
| 3,616,834 | 11/1971 | Hansen | 159/4 D |

FOREIGN PATENT DOCUMENTS 767459  2/1957  United Kingdom ..................... 159/4 D Primary Examiner—Hiram H. Bernstein
Attorney, Agent, or Firm—Sprung, Felfe, Horn, Lynch & Kramer

[57] ABSTRACT

Solids obtained from drying gases in an atomizing or spray drier are separated in an apparatus the lower part of which comprises an axial guide mechanism, which is connected by a rotationally symmetrical cowl to an angled gas outflow pipe which initially leads upwards in the center, then at the level of the guide mechanism runs outward radially.

12 Claims, 6 Drawing Figures

APPARATUS FOR THE MECHANICAL SEPARATION OF SOLIDS FROM DRYING GAS IN SPRAY DRIERS

The invention relates to an apparatus for the mechanical separation of solids obtained in spray driers from drying gas.

In the case of spray driers it is necessary to separate the solids suspended in gas in the form of light, fine-grained particles without mechanical damage to the individual particles as completely as possible from the drying gas.

A known process is to remove the drying gas together with the solids from the drier by suction and to effect the separation outside the dryer in known dust separation equipment, such as cyclone separators or filters. It is also a known practice to achieve the separation of solids in atomising driers by sucking the gas out through a tube open at the lower end located in the upper half of the conical drier bottom coaxially to the drier, causing a large portion of the solids to drop into the apex of the drier from where it can be removed. In another known separation process the drier gas is sucked out through an annular slot at the upper end of the conical drier bottom, whereby it is attempted to obtain the desired separation by means of a sharp diversion of the gas at the annular slot.

It is also known to set the drying gas in the entire spray drier in rotation by means of tangential gas inlets or radial guides in the upper part of the drier in order to produce centrifugal forces which drive the solid material onto the walls of the drier. The low solids content gas is removed through a pipe below located on the axis of the drier.

The processes published hitherto are, however, unsatisfactory since separation outside the drier necessitates a high pressure loss and separation in a cyclone can easily lead to product damage. A further disadvantage is the additional space required and the necessity for heat insulation. The exhaustion of the drying gas through a coaxial pipe open at the bottom or through an annular slot leads to insufficient separation especially with large driers and also to adverse effects on the drier flow.

The incorporation of the coaxial pipe or the annular slot in the upper half of the conical drier bottom results in a reduction of the active height of the drier. It becomes particularly unfavourable if in order to obtain good product separation, a swirl flow is created at the entrance to the drier by means of a tangential gas input or a radial guide mechanism, because particles which are still wet can strike and adhere to the wall by centrifugal force. In addition, layers of the product can form on the walls in strands, which are an impediment to the drying process. Optimum separation and good drying are mutually exclusive, and a compromise has to be made depending on the product. The downward clean gas pipe outlet is also a disadvantage as product removal and drier cleaning are thereby made more difficult.

The object of the invention is to improve substantially the internal separation of a fine grain product without affecting the flow in the active part of the drier.

According to the invention, there is provided an apparatus for the mechanical separation of solids from drying gas in spray driers comprising an axial guide means (for causing gas leaving the drying chamber to rotate) arranged in the lower conical part of the drier and connected to a rotationally symmetrical cowl having a vertical central down pipe and at least one radial outflow conduit at the level of the guide means.

The particular advantage attained with the apparatus according to the invention is that very good separation is obtained while the flow pattern in the drier part is scarcely affected. On the contrary, the down-flow of the drying gas through the circular section vane ring stabilises flow and thus improves drying. A further advantage is that product removal from the apex of the cone can be retained in its simplest form.

Moreover, product separation is damage-free as whereever the dust particles move in contact with the walls, their speed is low. The very high circumferential speeds necessary for good separation only occur in the centre of the separator. The apparatus provides both excellent separation and unusually low pressure loss. This was unexpected because according to all the rules of flow theory a pipe leading horizontally through the guide means should adversely affect swirl production.

Another important advantage of the apparatus of the invention is that no special housing is required and that a minimum of material is necessary for guide vanes, outflow pipe and shield dome. This is of especial interest in the case of very high cost materials.

A significant advantage for practical operation is to be seen in the fact that the equipment of the invention is very easy to clean.

In further developments of the apparatus of the invention, the axial guide means is formed by obliquely arranged guide vanes. These guide vanes can either be flat or curved. By means of this embodiment the flow in the conical drier bottom can be matched to the process technical factors required.

In a further development of the apparatus according to the invention the radial section of the gas outflow pipe is of oval section, its main axis running in the direction of the angle of pitch of the guide vanes, thus augmenting the effect of the guide vanes.

In a further development of the apparatus according to the invention the radially extending part of the gas outflow pipe is provided with take-off holes or slits in the bottom third thereof, preferably at the lowest point of the pipe circumference.

This step allows a partial gas flow of approximately 1–10%, preferably 3–6% of the total gas flow to be sucked out.

In a further embodiment of the apparatus of the invention the axial guide means is formed by at least four radially arranged pipes with guide vanes connected to a chamber which is coupled coaxially to the central down pipe at the outlet side of the downpipe. The gas outflow pipes create the swirl in the same way as the previously described vane ring.

In a further modification of the apparatus of the invention the radially arranged gas outflow pipes are of oval section, and the principal axes of their cross section run substantially in the direction of the desired swirl flow.

In order to keep the pressure loss in the conical part of the drier very low, in a further development of the apparatus of the invention take-off holes or slits are located in the bottom third of the radial gas out-flow pipes, preferably at the lowest point. The best results are achieved when a partial flow of approximately 10–50%, preferably 15–30% of the total gas flow is sucked out through these take-off holes or slits.

In a further development of the apparatus of the invention the radially arranged gas outflow pipes are in the form of hollow diagonally located guide vanes at the lowest point of which are provided holes or slits.

In a further development of the apparatus of the invention the central down pipe extends conically in the flow direction towards the top thereof. In this way the pressure loss in the separator system is reduced still further.

In a further development of the apparatus of the invention a cone is arranged underneath the central down pipe at an axial distance of from 3 to 10 times, preferably from 4 to 6 times the down pipe diameter, having an apex angle of 30° to 150°, preferably 60°–120°, and having a diameter which corresponds to at least half and preferably from 0.8 to 1.5 times the down pipe diameter.

This in particular prevents already separated particles which have collected in the lower part of the drier from rising up again.

The invention is further explained by the embodiments shown in the drawings.

FIG. 1: an overall view of the apparatus used according to the invention in section.

Figure 2:
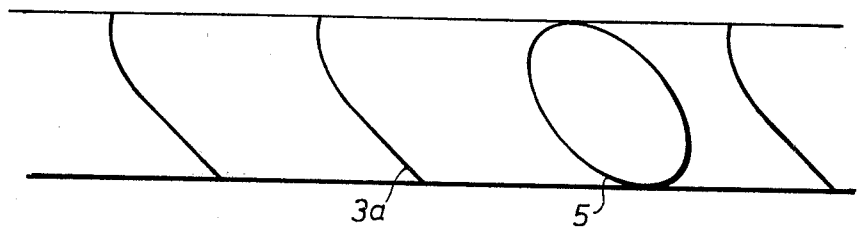

FIG. 2: a developed projection of the vane ring.

Figure 3:
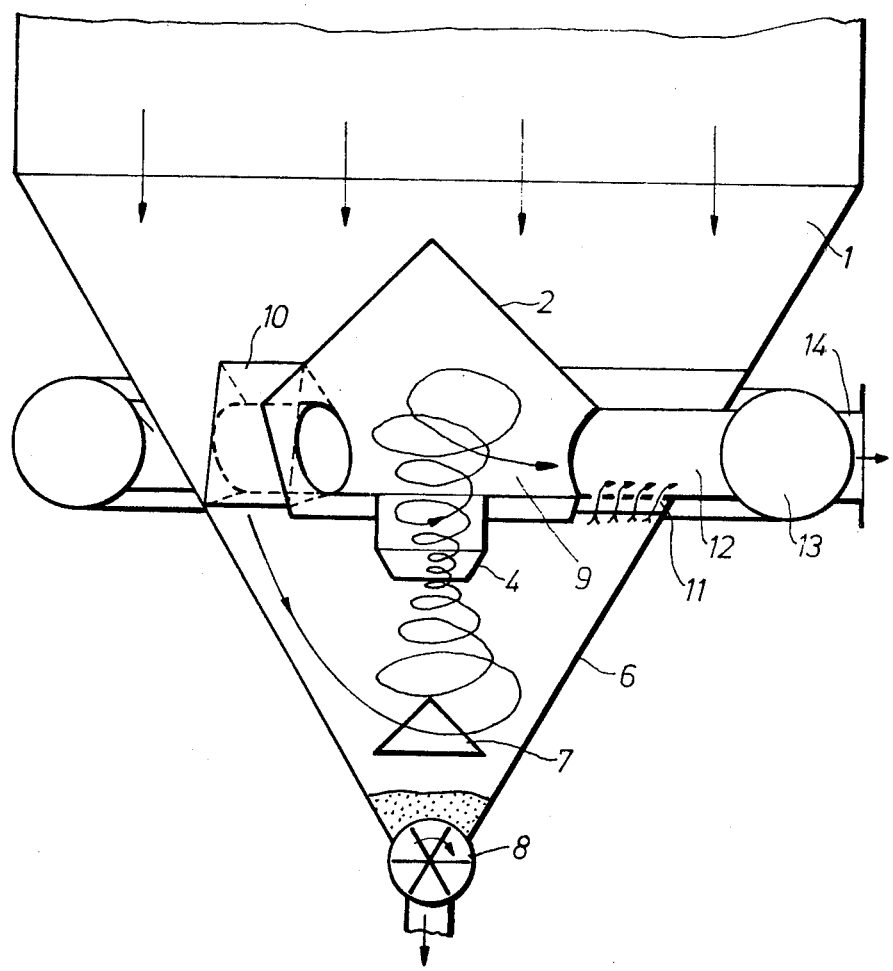

FIG. 3: a section through a separator system with several radially arranged gas outflow pipes.

Figure 4A:
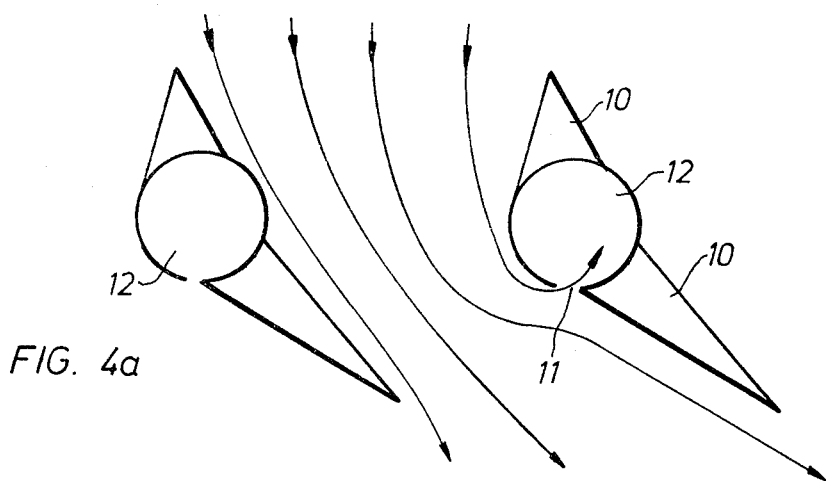

FIG. 4a: a section through a cylindrical gas outflow pipe with added guide plates and take-off holes.

Figure 4B:
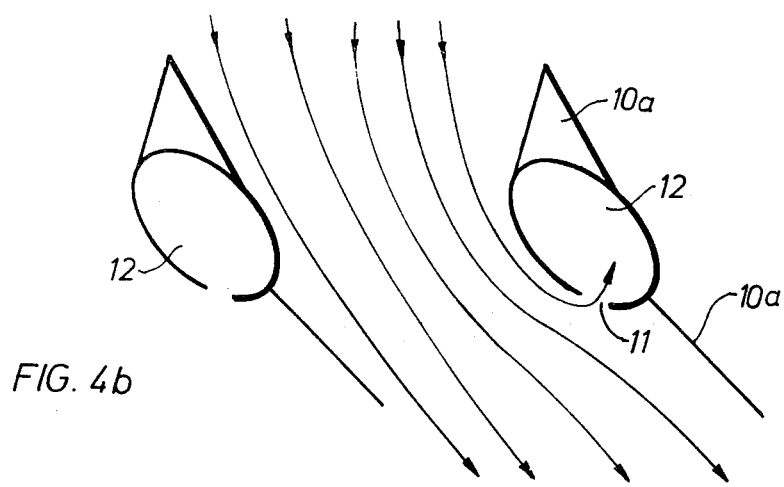

FIG. 4b: a section through an oval gas outflow pipe with guide plates and take-off holes.

Figure 5:
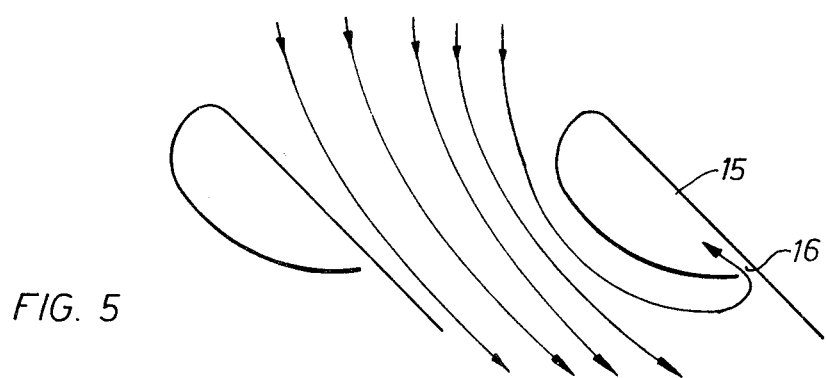

FIG. 5: shows the section through a hollow profile.

FIG. 1 shows the active drier chamber 1. A conical shield cowl 2 connects an axial guide means 3 with a central down pipe 4. A gas outflow pipe 5 leads radially from the central down pipe 4 out of the conical drier bottom 6. A vortex shield 7 covers the product outlet 8.

FIG. 2 shows the development of an axial guide means comprises curved vane 3a and the gas outflow pipe 5 having an oval cross-section.

FIG. 3 shows the conical shield cowl 2, beneath which is located a cylindrical or conical chamber 9. The central down pipe 4 opens coaxially into the cylindrical chamber and several gas outflow pipes 12 go off, leading to a collector ring conduit 13 with a further outlet conduit 14.

FIG. 4a shows a section through gas outflow conduits 12 having circular cross-section 5, guide plates 10 and gas outflow holes or slits 11.

FIG. 4b shows a section through gas outflow pipes 12 having oval cross-section 5, fitted with guide plates 10a and gas outflow holes or slits, 11.

FIG. 5 shows a hollow profile 15 used instead of the gas outflow pipes 12 with a take-off hole or slit 16.

The functioning of the apparatus according to the invention is illustrated as follows by FIGS. 1 to 5.

The product laden gas is set in rotation by the guide vanes 3 as it leaves the drying chamber. The product particles are driven to the conical wall of the lower part of the drier 6 and slide down to the outlet 8. The product is prevented from rising up again by the conical vortex shield 7, which is in itself known. The purified gas flow leaves the drier via the central down pipe 4 and the radial gas outflow pipe 5.

FIGS. 3, 4 and 5 show a further development of the apparatus according to the invention. The axial guide means consists of several radially arranged gas outflow pipes 12 having guide plates 10, whereby a partial gas flow is drawn off from product-free or low product content zones under the conduits 12 through the take-off holes or take-off slits 11. The separated product leaves the drier through the product outlet 8, and the product is prevented from rising up again by the conical vortex shield 7 which in itself is known.

EXAMPLE OF AN EMBODIMENT

The apparatus according to the invention can be explained more fully by means of an example.

Dyestuff with an average drain size of 100 $\mu$m dried in a drier of 5400 mm diameter by 15000 m$^3$/h of hot air at 100° C. In the conical lower part of the drier which has a cone angle of 60° C. a cone-shaped cowl is inserted which has a cone angle of 90° and a maximum diameter of 1800 mm. The swirl is produced by means of eight flat guide vanes having a length of 1000 mm and a minimum width of 400 mm. The vanes are at an angle of 40° to the horizontal. The down pipe is secured coaxially in the cone-shaped cowl, the pipe diameter at the pure gas inlet being 400 mm extending conically to 800 mm. At the level of the guide vanes a gas outflow pipe of 800 mm diameter leads out of the drier. 1500 mm under the lower end of the down pipe there is a vortex shield 600 mm in diameter and with a cone angle of 90° above the product outlet.

With the above gas throughputs a degree of separation of 95% was attained with a pressure loss of 18 mbar.

What we claim is:

1. An apparatus for the mechanical separation of solids from drying gas in spray driers comprising an axial guide means for causing gas leaving the drying chamber to rotate arranged in the lower conical part of the drier and connected by a rotationally symmetrical cowl to a vertical central down pipe having a downwardly disposed open inlet end within the lower conical part for receiving gas from the lower conical part, and at least one radial outflow conduit having an open inlet end communicated with the down pipe for receiving gas therefrom and extending from its inlet end radially outwardly to without the drier at the level of the guide means for discharge of gas from the drier.

2. An apparatus as claimed in claim 1 comprising at least four radial outflow conduits on which are mounted guide plates forming the axial guide means.

3. An apparatus as claimed in claim 2, wherein the outflow conduits lead into a ring conduit to which is connected a single gas take-off conduit.

4. An apparatus as claimed in claim 2, wherein the outflow conduits have an oval section the main axis of which are arranged in the desired swirl flow direction.

5. An apparatus as claimed in claim 1, wherein the axial guide means comprises a plurality of obliquely pitched guide vanes.

6. An apparatus as claimed in claim 5 wherein the guide vanes are flat.

7. An apparatus as claimed in claim 5 wherein the guide vanes are curved.

8. An apparatus as claimed in claim 5 wherein the radial outflow pipe has an oval section, the main axis of which runs in the direction of the angle of pitch of the guide vanes.

9. An apparatus as claimed in claim 1, wherein the at least one radial outflow conduit has gas take-off holes in the lower third thereof.

10. An apparatus as claimed in claim 9, wherein the take-off holes are arranged at the lowest point on the at least one conduit.

11. An apparatus as claimed in claim 1, wherein the down pipe is tapered conically at the lower end thereof.

12. An apparatus as claimed in claim 1, further comprising a conical vortex shield arranged below the down pipe.

* * * * *